United States Patent Office 3,159,647
Patented Dec. 1, 1964

---

3,159,647
1,5-DIAZABICYCLO[3.2.1]OCTANES
Fedor Poppelsdorf, Charleston, W. Va., assignor to Union
Carbide Corporation, a corporation of New York
No Drawing. Filed Feb. 27, 1961, Ser. No. 91,585
13 Claims. (Cl. 260—309.7)

This invention relates, in general, to a new class of organic bicyclic nitrogen-containing compounds which are derivatives of homopiperazine. In one aspect, this invention relates to 1,5-diazabicyclo[3.2.1]octanes and methods for their preparation.

This application is a continuation-in-part of an application entitled "Process for Separating 1-Methylhomopiperazine and Homopiperazine," Serial No. 4,862, filed January 27, 1960, now issued as U.S. Patent 3,040,028, in the name of the same inventor as the instant specification.

The novel compounds of this invention, hereinafter also referred to as 8-substituted 1,5-diazabicyclo[3.2.1]-octanes, can be conveniently represented by the following general formula:

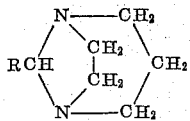

wherein R is a member selected from the group consisting of hydrogen and substituted and unsubstituted aliphatic, alicyclic, heterocyclic and aromatic groups. Preferred compounds represented by the aforesaid formula are those wherein R contains from 1 to about 18 carbon atoms, more preferably from 1 to about 12 carbon atoms, and still more preferably from 1 to about 8 carbon atoms, either as a straight chain, branched chain or part of a homocyclic or heterocyclic ring system. Particularly preferred 8-substituted 1,5-diazabicyclo[3.2.1]octanes are those compounds represented by the foregoing formula wherein R is alkyl, alkenyl, aryl, alkaryl, aralkyl, cycloalkyl, cycloalkylalkyl, alkylcycloalkyl, cycloalkenyl, bicycloalkyl, bicycloalkylalkyl, bicycloalkenyl containing from 1 to 12 carbon atoms and free from substituents which would react with homopiperazine. By the term "substituted" as used throughout the specification and appended claims to define the R group is meant that the aforementioned R group can be aliphatic with alicyclic or aromatic substituents; alicyclic with aliphatic or aromatic substituents; or aromatic with aliphatic or alicyclic substituents, as well as other substituents hereinafter disclosed.

The novel compositions of this invention are particularly useful as pharmaceutical intermediates and as modifiers of organometallic catalysts used in the polymerization of olefins. For instance, the novel bicyclic compounds of the present invention can be hydrolyzed with dilute aqueous mineral acids to form an aldehyde and homopiperazine. It is thus possible to obtain a relatively pure homopiperazine from an admixture of homopiperazine and its alkyl-substituted derivatives, which have similar characteristics, by the formation of the instant novel compositions. Thereafter, the homopiperazine can be formed in a high state of purity by the acid hydrolysis of these compounds.

Moreover, the 8-substituted 1,5-diazabicyclo[3.2.1]-octanes possess additional utility as fly repellants, pre-emergence herbicides and soil fumigants. For instance, an aqueous solution containing 1000 parts per million of 8-phenyl-1,5-diazabicyclo[3.2.1]octane was found to inhibit the germination of millet and amar grass seeds to the extent of 50 to 84 and 85 to 94 percent, respectively. Additionally, when 1,5-diazabicyclo[3.2.1]octane was applied at a concentration of 75 pounds per acre, the growth of the soil fungus Rhizoctonia solani was inhibited to the extent of about 80 percent.

It is accordingly an object of the present invention to provide new organic compounds which are suitable for use in the pharmaceutical field. Another object is to provide new compositions of matter comprising bicyclic, nitrogen-containing compounds. A further object of the present invention is to provide new compositions of matter comprising 1,5-diazabicyclo[3.2.1]octane and 8-substituted derivatives thereof. A still further object of the present invention is to provide novel bicyclic, nitrogen-containing compound which can contain one or more unsaturated groups. Another object is to provide a process for the preparation of the novel compositions of matter of this invention. These and other objects will readily become apparent to those skilled in the art in the light of the teachings herein set forth.

In its broad aspect, this invention is directed to the novel 8-substituted 1,5-diazabicyclo[3.2.1]octanes of the aforementioned general formula and to a process for their preparation. The following compounds illustrate the novel compounds of the present invention:

1,5-diazabicyclo[3.2.1]octane,
8-methyl-1,5-diazabicyclo[3.2.1]octane,
8-ethyl-1,5-diazabicyclo[3.2.1]octane,
8-propyl-1,5-diazabicyclo[3.2.1]octane,
8-nonyl-1,5-diazabicyclo[3.2.1]octane,
8-heptadecyl-1,5-diazabicyclo[3.2.1]octane,
8-phenyl-1,5-diazabicyclo[3.2.1]octane,
8-naphthyl-1,5-diazabicyclo[3.2.1]octane,
8-cyclohexyl-1,5-diazabicyclo[3.2.1]octane,
8-(2-bicyclo[2.2.1]heptyl)-1,5-diazabicyclo[3.2.1]octane,
8-vinyl-1,5-diazabicyclo[3.2.1]octane,
8-(2'-ethylhexyl)-1,5-diazabicyclo[3.2.1]octane,
8-(2'-furyl)-1,5-diazabicyclo[3.2.1]octane,
8-(2'-tetrahydrofuryl)-1,5-diazabicyclo[3.2.1]octane,
8-(2'-propenyl)-1,5-diazabicyclo[3.2.1]octane,
8(3'-butenyl)-1,5-'diazabicyclo[3.2.1]octane,
8,8'-di(1,5-diazabicyclo[3.2.1]octane),
1,3-bis[8-(1,5-diazabicyclo[3.2.1]octyl)]propane, and the like. The compounds hereinabove described are given only for purposes of illustration of the novel compositions of matter of the present invention and are not intended to be limited solely to those disclosed.

In one embodiment, the novel compositions which can be prepared by the process of the instant invention can be conveniently represented by the following formula:

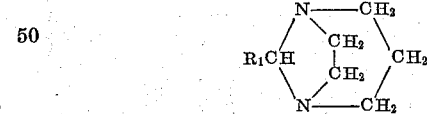

wherein $R_1$ represents an alkyl group containing from 1 to 18 carbon atoms, more preferably from 1 to 12 carbon atoms, and still more preferably from 1 to 8 carbon atoms.

Illustrative compounds within this embodiment include, among others, 8-methyl-1,5-diazabicyclo[3.2.1]octane,
8-ethyl-1,5-diazabicyclo[3.2.1]octane,
8-propyl-1,5-diazabicyclo[3.2.1]octane,
8-isopropyl-1,5-diazabicyclo[3.2.1]octane,
8-butyl-1,5-diazabicyclo[3.2.1]octane,
8-pentyl-1,5-diazabicyclo[3.2.1]octane,
8-heptyl-1,5-diazabicyclo[3.2.1]octane,
8-nonyl-1,5-diazabicyclo[3.2.1]octane,
8-undecyl-1,5-diazabicyclo[3.2.1]octane,
8-dodecyl-1,5-diazabicyclo[3.2.1]octane,
8-tetradecyl-1,5-diazabicyclo[3.2.1]octane,
8-hexadecyl-1,5-diazabicyclo[3.2.1]octane,
8-octadecyl-1,5-diazabicyclo[3.2.1]octane,
and the like.

In a second embodiment the novel compositions of the instant invention can be represented by the following formula:

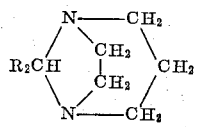

wherein $R_2$ represents an aryl group containing from 6 to 18 carbon atoms and more preferably from 6 to 12 carbon atoms. Illustrative novel compositions within this embodiment include, among others, 8-phenyl-1,5-diazabicyclo[3.2.1]octane,
8-naphthyl-1,5-diazabicyclo[3.2.1]octane,
8-anthryl-1,5-diazabicyclo[3.2.1]octane,
8-phenanthryl-1,5-diazabicyclo[3.2.1]octane,
8-(4'-biphenylyl)-1,5-diazabicyclo[3.2.1]octane,
8-(2'-indenyl)-1,5-diazabicyclo[3.2.1]octane,
8-(1'-pyrenyl)-1,5-diazabicyclo[3.2.1]octane, and the like.

In a third embodiment, novel 8-substituted 1,5-diazabicyclo[3.2.1]octanes can be represented by the formula:

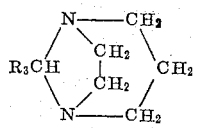

wherein $R_3$ represents a heterocyclic group containing from 4 to 18 carbon atoms, more preferably from 4 to 12 carbon atoms, and still more preferably from 4 to 8 carbon atoms. Typical 1,5-diazabicyclo[3.2.1]octanes substituted at the 8 position with heterocyclic groups include, among others, 8-(2'-furyl)-1,5¹diazabicyclo[3.2.1]octane,
8-(2'-tetrahydrofuryl)-1,5-diazabicyclo[3.2.1]octane,
8-(2'-phenanthridinyl)-1,5-diazabicyclo[3.2.1]octane,
8-(3'-pyridyl)-1,5-diazabicyclo[3.2.1]octane,
8-(3'-quinazolinyl)-1,5-diazabicyclo[3.2.1]octane, and the like.

In still another embodiment the novel compositions of the present invention can be conveniently represented by the following formula:

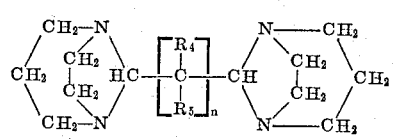

wherein $R_4$ and $R_5$ are members selected from the group consisting of hydrogen, hydroxy, alkyl, alkenyl, alkoxy, aryloxy and alkoxyalkoxy groups, and $n$ is a whole positive integer of from 0 to 9. Preferred compounds within this embodiment are those wherein the sum of the carbon atoms in $R_4$ and $R_5$ is from 0 to about 10, and $n$ has a value of from 0 to 4. Illustrative compounds within the aforesaid embodiment include, among others:

8,8'-di(1,5-diazabicyclo[3.2.1]octane),
1,1-bis[8-(1,5-diazabicyclo[3.2.1]octyl)]methane,
1,2-bis[8-(1,5-diazabicyclo[3.2.1]octyl)]ethane,
1,3-bis[8-(1,5-diazabicyclo[3.2.1]octyl)]propane,
2,2-dimethyl-1,3-bis[8-(1,5-diazabicyclo[3.2.1]octyl)]propane,
2-methyl-2-ethyl-1,3-bis[8-(1,5-diazabicyclo[3.2.1]octyl)]propane,
1,4-bis[8-(1,5-diazabicyclo[3.2.1]octyl)]butane, and the like.

In accordance with the process of this invention, the novel compounds can be produced in high yields by the reaction of an aldehyde (I) with an equivalent molar quantity of homopiperazine (II):

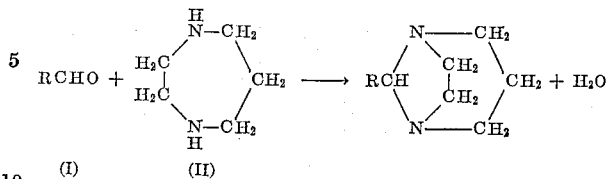

(I)    (II)

wherein R has the same value as previously indicated. The reaction of aldehydes and homopiperazine was unexpected and surprising, particularly for the aromatic aldehydes, since these aldehydes and secondary amines have been said not to react.

In a preferred embodiment one mole of the aldehyde for each mole of homopiperazine is gradually added with stirring to the homopiperazine. The mixture is stirred for about 30 minutes after the addition of the aldehyde has been completed. The novel reaction product can thereafter be recovered in a high degree of purity by distillation or by crystallization from a suitable solvent such as triethylamine, hexane, benzene, cyclohexane, and the like.

Reaction temperatures are not necessarily critical and can range from about —20° C. to about 200° C. The preferred temperature range is from about 20° to about 120° C. Similarly, the reaction time can vary from one half to 24 hours.

Since the reaction is exothermic it may be desirable to control the reaction temperature by cooling or by rate of addition of aldehyde. In any event, temperatures in excess of 180° C., can lead to appreciable decomposition of the product and should therefore be avoided.

The starting materials for the production of the novel compounds of the present invention, as hereinbefore described, are homopiperazine and aldehydes. Aliphatic, aromatic, and heterocyclic aldehydes are all applicable for preparing the aforesaid novel compounds, with the exception of unsaturated aldehydes in which the carbon to carbon double bond is conjugated to the carbonyl group. Suitable aldehydes include those represented by the formulae: RCHO, $R_1$CHO, $R_2$CHO and $R_3$CHO wherein each of said R-$R_3$ has the same value as previously indicated. Examples of such aldehydes are the following: Formaldehyde, acetaldehyde, propionaldehyde, butyraldehyde, 3-butenal, 4-pentenal, pentanal, hexanal, 2-ethylhexaldehyde, stearaldehyde, glyoxal, adipaldehyde, glutaraldehyde, 2-hydroxyadipaldehyde, cyclohexanecarboxaldehyde, 4-cyclohexencarboxaldehyde, bicyclo[2.2.1]heptanecarboxaldehyde, bicyclo[2.2.1]-5-heptene-2-carboxaldehyde, benzaldehyde, p-chlorobenzaldehyde, anisaldehyde, p-nitrobenzaldehyde, 1-naphthaldehyde, salicylaldehyde, furfural, tetrahydrofurfural, 2-formyltetrahydropyran, 2-indolealdehyde, 3-indolealdehyde, 2-thiophenealdehyde, 3-thiophenealdehyde, phenylacetaldehyde, phenylpropionaldehyde, and the like.

Other aldehydes, containing from 2 to 18 carbon atoms are also applicable in the practice of this invention. Although the preferred aldehydes employed as starting materials contain no elements other than carbon, hydrogen and oxygen, they can contain other elements such as nitrogen, sulfur, chlorine (when substituted on an aromatic nucleus), and the like. The only requirement being that such elements do not react adversely with the homopiperazine or prevent the combination of the aldehyde and homopiperazine.

Inasmuch as the interatcion of the aldehyde with the homopiperazine causes the formation of an equimolar quantity of water, the use of a drying agent, such as anhydrous magnesium sulfate, may be desirable, though not absolutely necessary. Likewise a solvent can be employed as the reaction medium provided it is essentially chemically inert towards the reactants and products. Typical solvents include benzene, toluene, and the like.

The following examples are illustrative:

EXAMPLE I

1,5-Diazabicyclo[3.2.1]Octane

An aqueous 37.1 percent solution of formaldehyde (243 grams, 3 moles) was added with stirring over a ten minute period to a solution of 300.6 grams (3 moles) of homopiperazine in 619 grams of benzene. A markedly exothermic reaction set in, with enough heat being liberated to cause the reaction mixture to boil towards the end of the addition of aldehyde. After all the formaldehyde had been introduced, the mixture was stirred for an additional hour and then dehydrated azeotropically. Distillation of the dried benzene solution at a reflux ratio of 3 to 1 through a column having an efficiency of about 10 theoretical plates gave 323 grams of 1,5-diazabicyclo[3.2.1]octane (96 percent yield) as a fraction boiling at 173.5° C. at a pressure of 742 millimeters of mercury. The product had a melting point of 108–109° C. and the following analysis: Calculated for $C_6H_{12}N_2$: C, 64.23; H, 10.78; N, 24.98. Found: C, 63.35; H, 10.72; N, 24.78.

EXAMPLE II

8-Methyl-1,5-Diazabicyclo[3.2.1]Octane

An aqueous solution of acetaldehyde (450 grams, 10.3 moles) was gradually added to a solution of 1,001.6 grams (10 moles) of homopiperazine in 2,000 grams of benzene. A markedly exothermic reaction took place. After all the acetaldehyde had been introduced, the mixture was stirred for an additional period and then dehydrated azeotropically. Distillation of the dried benzene solution gave 8-methyl-1,5-diazabicyclo[3.2.1]octane as a fraction boiling at 78° C. at a pressure of 20 millimeters of mercury. The product had a refractive index, $n_D^{20}$, of 1.4851 and the following analysis: Calculated for $C_7H_{14}N_2$: C, 66.62; H, 11.18; N, 22.20; molecular weight, 126.20. Found: C, 67.0; H, 11.26; N, 21.9; molecular weight, 129.

EXAMPLE III

8-Ethyl-1,5-Diazabicyclo[3.2.1]Octane

To 200.4 grams (2 moles) of molten homopiperazine, 116.2 grams (2 moles) of propionaldehyde were gradually added with stirring resulting in a markedly exothermic reaction. The mixture was stirred for an additional period after the addition of the aldehyde had been completed and then distilled under reduced pressure through a fractionating column. 8-ethyl-1,5-diazabicyclo[3.2.1]octane was obtained as a fratcion boiling at 87°–87.2° C. at a pressure of 20 millimeters of mercury. The product had a refractive index, $n_D^{20}$, of 1.4816 and the following analysis: Calculated for $C_8H_{16}N_2$: C, 68.52; H, 11.50; N, 19.98; molecular weight, 140.22. Found: C, 68.67; H, 11.63; N, 20.2; molecular weight, 143.

EXAMPLE IV

8-Propyl-1,5-Diazabicyclo[3.2.1]Octane

To 300.6 grams (3 moles) of molten homopiperazine, 216.3 grams (3 moles) of n-butyraldehyde were gradually added with stirring over a twenty minute period. A markedly exothermic reaction took place. The mixture was stirred for fifteen minutes after the addition of the aldehyde had been completed and then distilled under reduced pressure at a reflux ratio of 3 to 1 through a fractionating column having an efficiency of about ten theoretical plates. 381.9 grams of 8-propyl-1,5-diazabicyclo[3.2.1]octane (82.5 percent yield) was obtained as a fraction boiling at 103° C. at a pressure of 20 millimeters of mercury. The compound had a refractive index, $n_D^{20}$, of 1.4786, and the following analysis: Calculated for $C_9H_{18}N_2$: C, 70.07; H, 11.76; N, 18.17; molecular weight, 154.25. Found: C, 69.76; H, 11.69; N, 18.4; molecular weight, 156.

EXAMPLE V

8-(1'-Ethylpentyl)-1,5-Diazabicyclo[3.2.1]Octane

To a solution of 300.6 grams (3 moles) of homopiperazine in 619 grams of benzene, 384.6 grams (3 moles) of 2-ethylhexaldehyde were gradually added with stirring. The reaction was markedly exothermic. After the addition of the aldehyde had been completed, the mixture was stirred for an additional period and then dehydrated azeotropically. Distillation of the dried benzene solution through a fractionating column gave 8-(1'-ethylpentyl)-1,5-diazabicyclo[3.2.1]octane as a fraction boiling at 96° C. at a pressure of 1.0 millimeters of mercury. The product had a refractive index, $n_D^{20}$, of 1.4775 and the following analysis: Calculated for $C_{13}H_{26}N_2$: C, 74.22; H, 13.42; N, 13.32; molecular weight, 210.35. Found: C, 74.3; H, 13.1; N, 13.2; molecular weight, 211.

EXAMPLE VI

8-Phenyl-1,5-Diazabicyclo[3.2.1]Octane

To a solution of 300.6 grams (3 moles) of homopiperazine in 619 grams of benzene, 318.4 grams of benzaldehyde (3 moles) were gradually added with stirring over a ten minute period. The reaction was sufficiently exothermic to cause the mixture to boil. The mixture was stirred for 30 minutes after the addition of the benzaldehyde had been completed, and then the water liberated during the reaction was removed azeotropically. Concentration and cooling of the dried benzene solution caused the separation of 533.8 grams of colorless crystals of 8-phenyl-1,5-diazabicyclo[3.2.1]octane which represented a 94.5 percent yield. After being crystallized from triethylamine and hexane the product had a melting point of 82–84° C. Analyses showed the product to have the following composition: Calculated for $C_{12}H_{16}N_2$: C, 76.5; H, 8.6; N, 15.0; molecular weight, 188; neutralization equivalent, 94.1. Found: C, 76.4; H, 8.8; N, 14.7; molecular weight, 188; neutralization equivalent, 94.3.

EXAMPLE VII

8-(Para-Chlorophenyl)-1,5-Diazabicyclo[3.2.1]Octane

To a solution of 100.2 grams (1 mole) of homopiperazine in 500 cubic centimeters of benzene, 140.6 grams (1 mole) of para-chlorobenzaldehyde were gradually added with stirring. The reaction was sufficiently exothermic to cause the mixture to boil. After the addition of the aldehyde had been completed, the water liberated during the reaction was removed azeotropically. Concentration and cooling of the dried benzene solution caused the separation of crystals of 8-(para-chlorophenyl)-1,5-diazabicyclo[3.2.1]octane. After recrystallization from toluene the product had a melting point of 94–95° C. Analyses showed the product to have the following composition: Calculated for $C_{12}H_{15}N_2Cl$: C, 64.71; H, 6.80; N, 12.58. Found: C, 64.86; H, 6.93; N, 12.53.

EXAMPLE VIII

8-(2'-Furyl)-1,5-Diazabicyclo[3.2.1]Octane

Redistilled furfural (144.1 grams, 1.5 moles) was added with stirring over a ten minute period to a solution of 150.3 grams (1.5 moles) of homopiperazine in 300 grams of benzene. A strongly exothermic reaction took place. The mixture was stirred for 30 minutes after the addition of the aldehyde had been completed and then dehydrated azeotropically in a stream of dry nitrogen. Evaporation of the dried solution at a kettle temperature of less than 100° C. left a black tar. The residue was extracted twice with 200 cubic centimeter portions of boiling hexane and the extracts filtered through a plug of glass wool. Brown crystals (217.9 grams) separated on cooling the hexane extracts. Sublimation of this solid at a pressure of 1.0 millimeter of mercury followed by crystallization of the sublimate from hexane afforded colorless needles of 8(2'-furyl)-1,5-diazabicyclo[3.2.1] octane. The product had a melting point of 79° C., and the following analysis: Calculated for $C_{10}H_{14}N_2O$: C, 67.39; H, 7.92; N, 15.72. Found: C, 67.43; H, 7.97; N, 15.54.

EXAMPLE IX

*8,8'-Di(1,5-Diazabicyclo[3.2.1.]Octane*

An aqueous 30 percent solution containing 145.1 grams (0.75 mole) of glyoxal was added with stirring over a ten minute period to a solution of 150.3 grams (1.5 moles) of homopiperazine in 300 grams of benzene. The reaction was exothermic, with enough heat being liberated to cause the reaction mixture to boil towards the end of the aldehyde addition. Stirring of the mixture was continued for 30 minutes after all the aldehyde had been added and then allowed to cool to room temperature (23° C.). A black solid separated which was collected and washed twice with 20 cubic centimeter portions of ice-water, leaving 131.4 grams of a buff-colored solid. Crystallization of this product from benzene, hexane and finally toluene gave pure 8,8'-di(1,5-diazabicyclo[3.2.1] octane) as almost colorless prisms. The product had a melting point of 187° C., and the following analysis: Calculated for $C_{12}H_{22}N_4$: C, 64.82; H, 9.97; N, 25.20. Found: C, 65.16; H, 10.07; N, 25.69.

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. 1,5-diazabicyclo[3.2.1]octane represented by the formula:

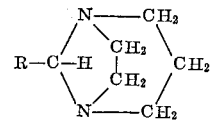

wherein R is a monovalent radical containing up to 18 carbon atoms selected from the group consisting of hydrogen, alkyl, alkenyl, cycloalkyl, cycloalkenyl, hydrocarbon aryl, furyl, tetrahydrofuryl, and pyridyl.

2. 8-alkyl-1,5-diazabicyclo[3.2.1]octane wherein the said alkyl substituent has 1 to 8 carbon atoms.

3. 8 - hydrocarbon aryl-1,5-diazabicyclo[3.2.1]octane wherein said aryl group has 6 to 12 carbon atoms.

4. 8 - alkenyl - 1,5 - diazabicyclo[3.2.1]octane wherein said alkenyl group has 3 to 8 carbon atoms.

5. 8-cycloalkyl-1,5-diazabicyclo[3.2.1]octane wherein said cycloalkyl group has 3 to 8 carbon atoms.

6. 8-cycloalkenyl-1,5-diazabicyclo[3.2.1]octane wherein said cycloalkenyl group has 3 to 8 carbon atoms.

7. 1,5-diazabicyclo[3.2.1]octane.

8. 8-methyl-1,5-diazabicyclo[3.2.1]octane.

9. 8-(1'-ethylpentyl)-1,5-diazabicyclo[3.2.1]octane.

10. 8-phenyl-1,5-diazabicyclo[3.2.1]octane.

11. 8-(para - chlorophenyl) - 1,5 - diazabicyclo[3.2.1] octane.

12. 8-(2'-furyl)-1,5-diazabicyclo[3.2.1]octane.

13. 8,8'-di(1,5-diazabicyclo[3.2.1]octane).

References Cited in the file of this patent

UNITED STATES PATENTS 3,040,028    Poppelsdorf _____ June 19, 1962